(12) United States Patent (10) Patent No.: US 9,003,365 B1
Vogelheim (45) Date of Patent: Apr. 7, 2015

(54) RAPID PRESENTATIONS OF VERSIONS

(75) Inventor: Daniel Vogelheim, Unterhaching (DE)

(73) Assignee: Google Inc., Mountain View, CA (US)

( * ) Notice: Subject to any disclaimer, the term of this patent is extended or adjusted under 35 U.S.C. 154(b) by 302 days.

(21) Appl. No.: 13/552,779

(22) Filed: Jul. 19, 2012

(51) Int. Cl.
*G06F 9/44* (2006.01)
*G06F 9/46* (2006.01)

(52) U.S. Cl.
CPC ....................................... *G06F 9/46* (2013.01)

(58) Field of Classification Search
None
See application file for complete search history.

(56) References Cited

U.S. PATENT DOCUMENTS

| | | | |
|---|---|---|---|
| 6,757,893 B1 * | 6/2004 | Haikin | 717/170 |
| 7,042,547 B2 * | 5/2006 | Wu | 349/192 |
| 2002/0116702 A1 * | 8/2002 | Aptus et al. | 717/170 |
| 2010/0036871 A1 * | 2/2010 | Beckey et al. | 707/103 R |
| 2010/0114825 A1 * | 5/2010 | Siddegowda | 707/638 |
| 2011/0161376 A1 * | 6/2011 | Dickson et al. | 707/803 |
| 2011/0282854 A1 * | 11/2011 | Abnous et al. | 707/705 |
| 2012/0203657 A1 * | 8/2012 | Jacob Sushil et al. | 705/26.5 |
| 2013/0135180 A1 * | 5/2013 | McCulloch et al. | 345/8 |

OTHER PUBLICATIONS

Hudson, "Notes on keeping version histories of files," mit.edu, Jun. 24, 2002 [retrieved on Oct. 20, 2014]. Retrieved from the Internet: URL <http://web.mit.edu/ghudson/thoughts/file-versioning>, 4 pages.
"Oracle® Solaris ZFS Administration Guide," Oracle, Apr. 2012, 332 pages.
'Bazaar' [online] "What a weave is," May 14, 2009 [retrieved on Oct. 20, 2014]. Retrieved from the Internet: URL <http://wiki.bazaar.canonical.com/BzrWeaveFormat>, 6 pages.

* cited by examiner

*Primary Examiner* — Don Wong
*Assistant Examiner* — Roberto E Luna
(74) *Attorney, Agent, or Firm* — Fish & Richardson P.C.

(57) ABSTRACT

Methods, systems, and apparatus, including computer programs encoded on a computer storage medium, for the rapid presentations of versions. In one aspect, a method includes receiving a document that includes multiple versions of source code of a computer program, each version comprising lines, each distinct line represented once in the document and identifying every version in which the line appears. The method includes presenting a user interface that enables a user to select one of the versions. The method includes receiving a selection of a first version of the source code. The method includes extracting the content of the first version from the document based solely on the content in the document and without receiving additional information from the server system. The method also includes displaying the distinct lines that identify the first version and not displaying the distinct lines that do not identify the first version.

12 Claims, 7 Drawing Sheets

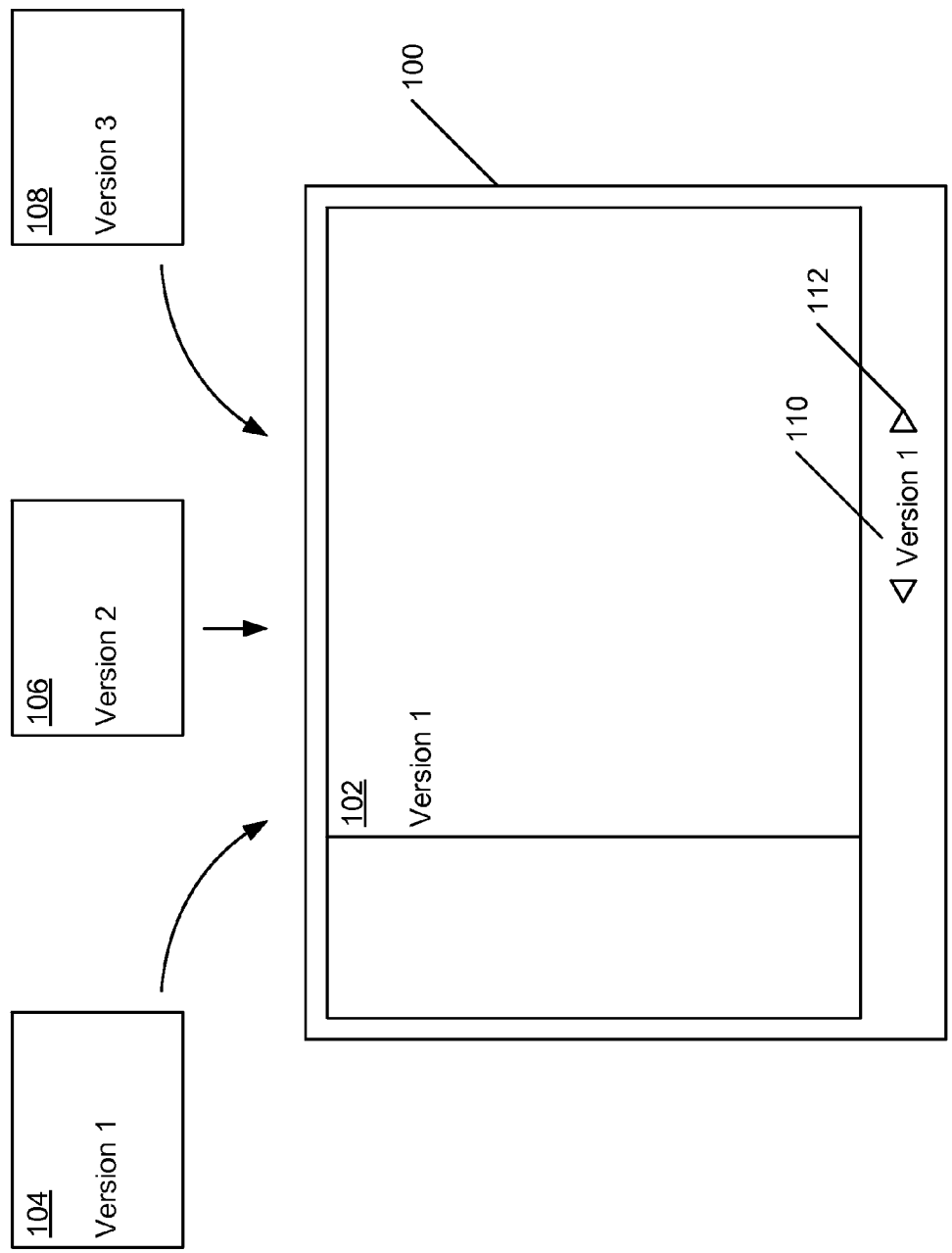

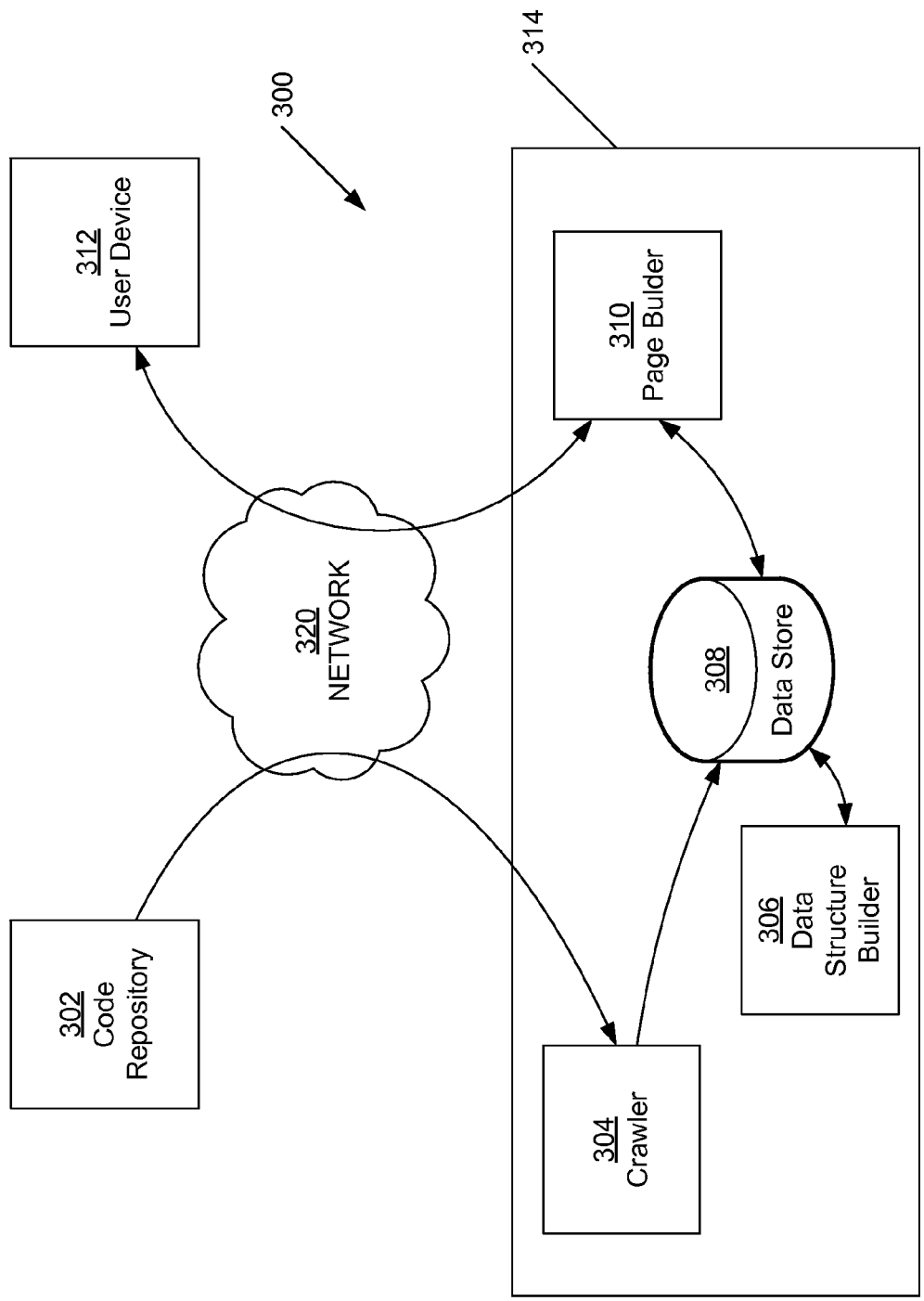

| | |
|---|---|
| V1V, V2V, V3V | class HelloWorld { |
| V1V, V2V, V3V |   public static void main (String args[]) { |
| V1V |     System.out.println("Hello World!"); |
| V2V, V3V |     System.out.println("Hello World Wide Web!"); |
| V3V |     System.out.println("Goodbye!"); |
| V1V, V2V, V3V |   } |
| V1V, V2V, V3V | } |

```
...
<div class="V1V V2V V3V">
  <p>class Hello World{</p>
  <p>    public static void main (String args[]){<p>
</div>
<div class="V1V">
  <p>        System.out.println("Hello World!");</p>
</div>
<div class="V2V V3V">
  <p>        System.out.println("Hello World Wide Web!");</p>
</div>
<div class="V3V">
  <p>        System.out.println("Goodbye!");<p>
</div>
<div class="V1V V2V V3V">
  <p>    }<p>
  <p>}<p>
</div>
...
```

FIG. 4

RAPID PRESENTATIONS OF VERSIONS

BACKGROUND

This specification relates to the presentation of documents that have multiple versions.

Source code for computer programs can be stored in version control systems. Version control systems maintain a history of changes made to documents, source code for computer programs, and other information. Users of version control systems can obtain current or historic versions of information stored in the version control system.

SUMMARY

This specification describes technologies relating to presentation of source code.

In general, one innovative aspect of the subject matter described in this specification can be embodied in methods that include the actions of receiving a document, from a server system, that includes content of multiple versions of source code of a computer program, each version of the source code comprising one or more lines, wherein each distinct line is represented only once in the document and the representation of each distinct line identifies every version of the source code in which the line appears. The methods include the actions of presenting to a user a user interface element that enables the user to select one of the multiple versions of the source code. The methods include the actions of receiving from the user a selection of a first version of the source code. The methods include the actions of extracting the content of the first version from the document by identifying the distinct lines of the document that identify the first version based solely on the content in the document and without receiving additional information from the server system. The methods include the actions of displaying the distinct lines of the document that identify the first version and not displaying the distinct lines of the document that do not identify the first version.

In general, another innovative aspect of the subject matter described in this specification can be embodied in methods that include the actions of receiving a request from a user device for source code of a computer program, wherein the program has multiple versions of source code and at least one pair of versions share a common line. The methods include the actions of obtaining a data structure corresponding to the multiple versions, the data structure including an entry for each distinct line occurring in the versions, each entry identifying all of the versions in which the corresponding unique line occurs. The methods include the actions of generating a document based on the data structure, the document including content of the multiple versions of source code of the computer program, wherein each distinct line is represented only once in the document and the representation of each distinct line identifies every version of the source code in which the line appears.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The methods may include the actions of receiving input from a user, the input identifying a second version of the multiple versions and presenting the second version of the multiple versions to the user including displaying portions of the document that identify the second version and hiding portions of the document that do not identify the second version. Each line may be delineated by an end of line character. Ordering of the portions in the document may substantially preserve the ordering of the lines in each version of the multiple versions. The methods may include sending the document to the user device Particular embodiments of the subject matter described in this specification can be implemented so as to realize one or more of the following advantages. Different versions of source code for a program can be rapidly displayed on a user device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1 illustrates an example user interface for displaying multiple versions of the source code program on a user device.

FIG. 3A illustrates an example system that enables a user to transition rapidly between versions of source code for a program.

FIG. 4 illustrates creating a portion of an HTML to represent multiple versions of source code for a computer program using a data structure.

Like reference numbers and designations in the various drawings indicate like elements.

DETAILED DESCRIPTION

Figure 2A:
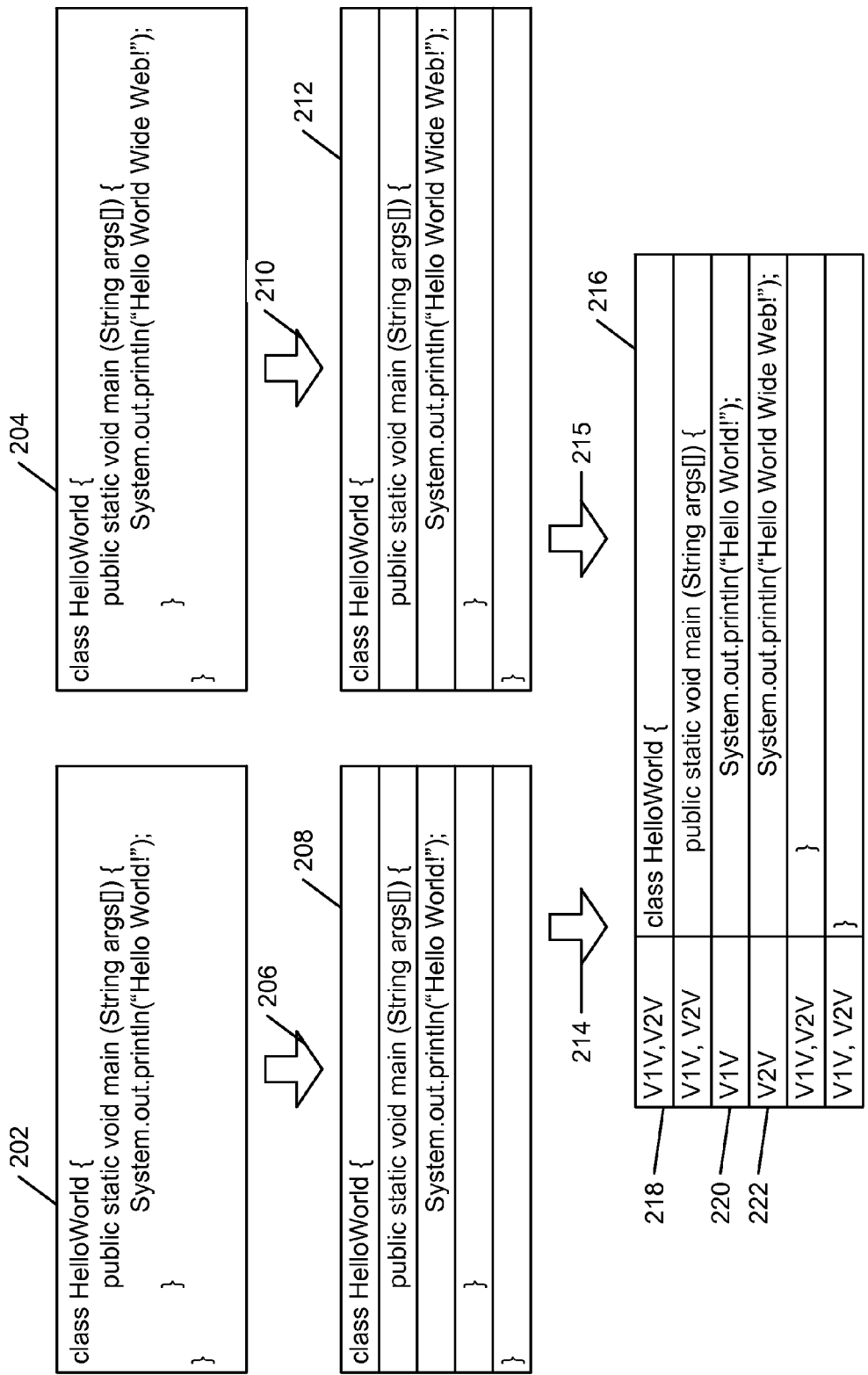
FIGS. 2A-B illustrate creating a data structure from two different versions of source code for a computer program.

Computer programs ("programs") change over time. Software developers make changes to programs, including, but not limited to, fixing errors and adding new capabilities. In general, programs are modified by changing their source code, which may be later compiled to generate an executable form of the program. The source code generally includes declarations and statements written in a computer programming language. Generally, source code is text stored in one or more files. The text can be made up of one or more lines, where each line is delimited with a special end of line character, for example, a line feed, a carriage return or a carriage return coupled with a line feed.

FIG. 1 illustrates an example user interface for displaying multiple versions of program source code on a user device. In this example, the computer program includes three versions, a first version 104, a second version 106, and a third version 108. The versions are presented in a user interface 100 that includes a version display area 102 and a version selector 110. The version selector 110 can be, for example, a set of arrows, a scrollbar, a set of links, or any other user interface element or arrangement that enables a user to select one of the multiple versions of source code. The user interface can be implemented as one or more web pages (e.g., hypertext markup language (HTML) documents) displayed by a web browser running on the user device.

In this example, the version display area 102 displays the first version of the source code. If the user selects a different version of the source code, for example by selecting (clicking) an arrow 112 in the version selector 110, the version display area 102 changes to display the selected version.

In general, different versions of the source code are stored on a remote server. In some implementations, different versions of the source code can be stored locally. Switching from one version to another tends to include long latency delays as the user device requests the relevant version and waits for the server to obtain the version and return it. These delays can be eliminated, and efficiency improved, by providing the client device with all versions of the source code when the first version is requested.

Figure 2B:
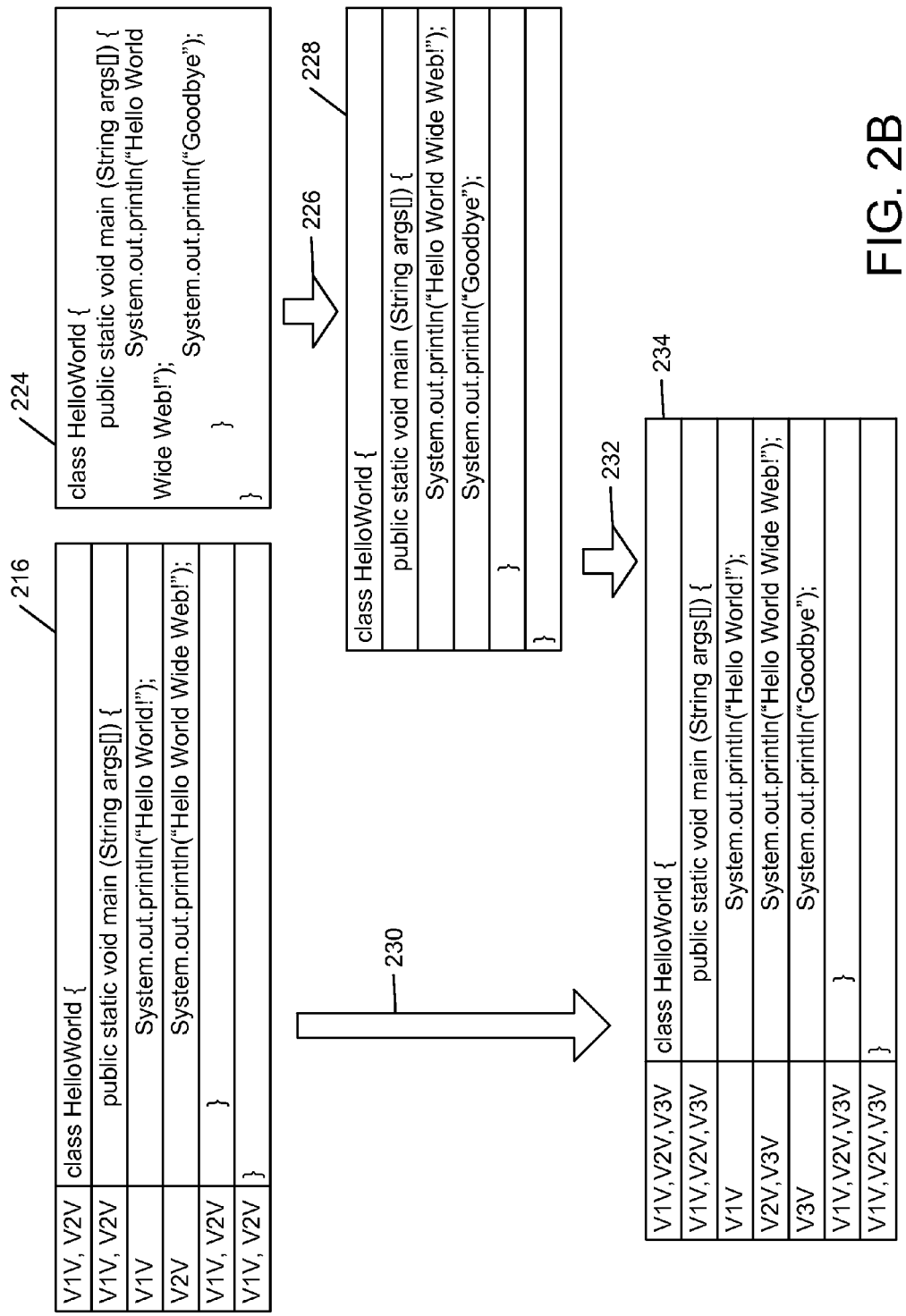

FIGS. 2A-B illustrate creating a lattice from two different versions of source code for a computer program. As shown in FIG. 2A, two or more versions of source code can be combined in a data structure that represents a single partially ordered set of the lines from the different versions. Because different versions of source code generally have many lines in common, the data structure generally requires less storage space than storing each version separately.

In this example, a first version (V1V) of the source code 202 contains lines of code for a simple program. As represented by process arrow 206, the source code 202 can be divided into a first ordered set of lines 208 of source code. Similarly, represented by process arrow 210, a second version ("V2V") of the source code 204 for a later version of the program can be divided into a second ordered set of lines 212. Represented by process arrows 214 and 215, the two ordered sets of lines can be combined into a single data structure that maintains a partial ordering of the lines. The data structure includes, for each line, an indication of the versions in which the line exists. For example, item 218 indicates that the line exists in both the first version and the second version of the code. Item 220 indicates that the line exists in the first version of the code, but not the second version. Finally, item 222 indicates that the line exists in the second version of the code but not the first.

As shown in FIG. 2B, in some implementations, subsequently obtained versions of the source code of an application can be added to the data structure without recreating the entire data structure; instead, the subsequent version is compared to the contents of the data structure and version indicators are updated and items are added. In this example, a third version ("V3V") of the source code 224 is obtained. Represented by process arrow 226, the third version of the source code 224 is divided into a third ordered set of lines 228. Represented by process arrows 230 and 232, the data structure 216 is combined with the third ordered set of lines 228 to produce an updated data structure 234. In this example, the items corresponding to lines in the first or second version which also exist in the third version are updated to indicate that these lines exist in the third version. Items are added to the data structure for each line that exists in the third version and did not exist in either the first version or the second version. In scenarios where an item refers to a line that exists in either the first version or the second version, and does not exist in the third version the item is not updated.

In some implementations, other types of files, in addition to source code, can be processed. For example, the system can obtain multiple versions of word processing files, HTML pages, XML documents, etc. In these implementations, instead of segmenting source code into lines, the documents can be segmented using other criteria. For example, word processing files can be segmented into characters, words, sentences, or paragraphs. XML documents can be segmented into tags.

FIG. 3A illustrates an example system 300 that enables a user to transition rapidly between versions of source code for a program. In this example system, source code is stored in a source code repository 302. The source code repository 302 may be accessible over a network 320 using standard protocols, for example, hypertext transport protocol (HTTP) requests or an application programming interface (API) specific to a version control system which manages the code repository 302. Source code can also be made available from other sources, for example, HTML pages stored on the World Wide Web.

A crawler 304 can access the code repository 302 over the network 320 using one of the protocols supported by the code repository 302. The crawler 304 can obtain a version of source code for a program and store it in the data store 308. In some scenarios, where the code repository 302 makes available multiple versions of the source code stored in the code repository 302, the crawler 304 can obtain multiple versions of the source code sequentially. In other scenarios, the crawler can access the source code at different times and thereby obtain different versions as the current version of the source code changes. The frequency with which the crawler 304 accesses the code repository 302 can be adjusted to minimize the likelihood that a version is missed. Optionally, the code repository 302 can be implemented to notify the crawler 304 when a new source code version becomes available.

A data structure builder 306 obtains the multiple versions of the source code for a program from the data store 308. The data structure builder 306 creates a data structure representing the multiple versions of the source code, as described above with reference to FIG. 2A and FIG. 2B. The data structure builder 306 can store the newly created data structure in the data store 308 or in some other data repository.

At some later time, a user device 312 requests one of the multiple versions of the source code. For example, the user device 312 can send an HTTP request for the source code over the network 320 to a server 314. The page builder 310 receives the request and obtains the data structure from the data store 308. Using the data structure, the page builder 310 constructs a document that can be rendered by a user device to display each version of the multiple versions of the source code. For example, the page builder can build an HTML page that includes each of the multiple versions. In some implementations, the HTML page also includes scripts or programs, e.g., JavaScript scripts or Java programs, and graphical user interface elements which the user can activate to switch between versions without making subsequent requests to the server.

The page builder 310 provides the HTML page to the user device 312.

In some implementations, the crawler 304, the data store 308, the data structure builder 306, and the page builder 310 can be located on separate servers, or may be grouped together in different combinations on different servers. In some implementations, the user device 312 can send a request to a web server which accesses the page builder 310. In some implementations, the data structure builder 306 can be included in the page builder 310.

In some implementations, multiple data structures can be created for large source code files. For example, a data structure can be built for each 100 lines of source code, such that a 1500 line source code file would correspond to 15 data structures.

Figure 3B:
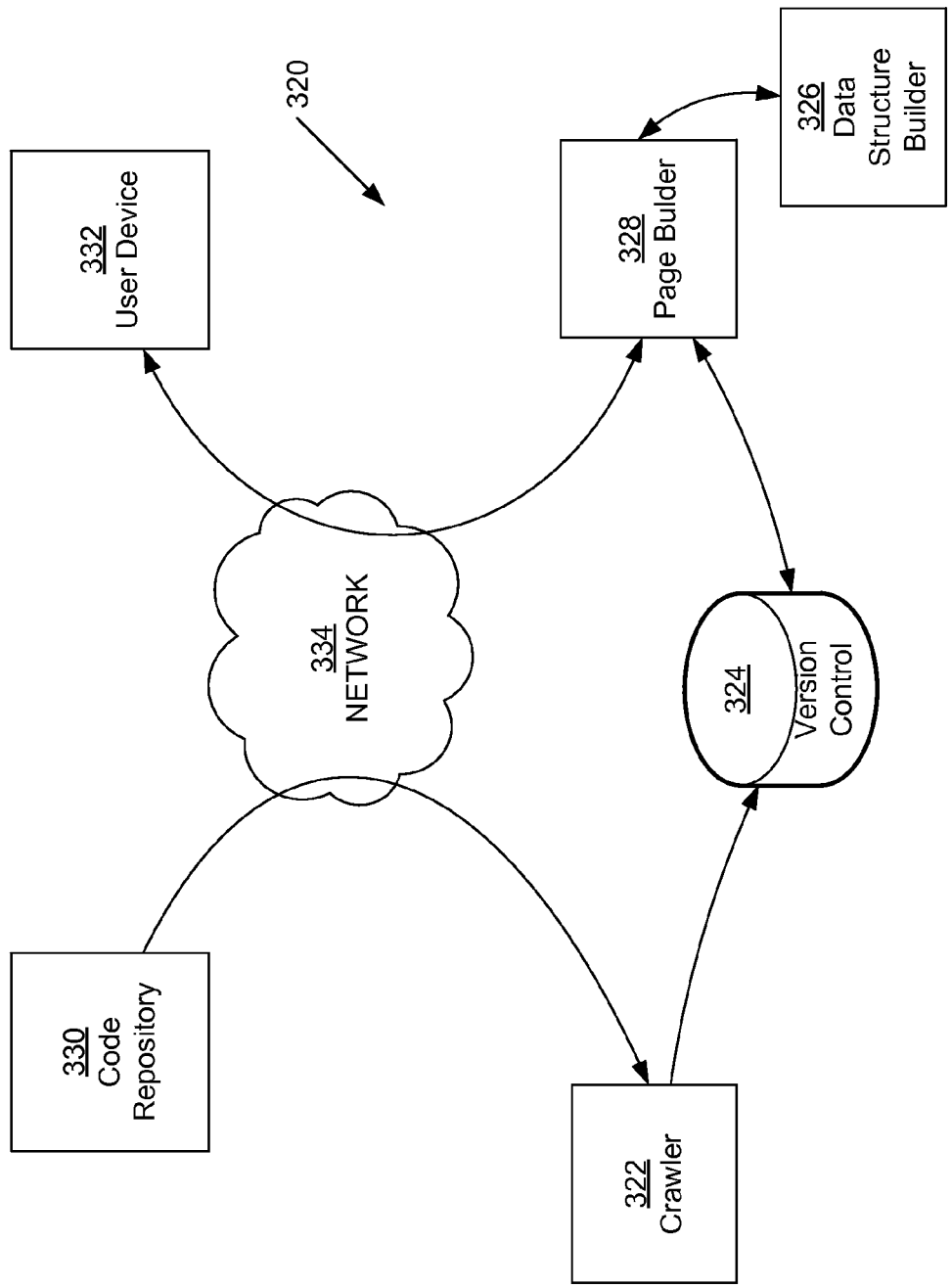
FIG. 3B illustrates another example system that enables a user to transition rapidly between versions of source code for a program

FIG. 3B illustrates another example system 320 that enables a user to transition rapidly between versions of source code for a program. In this example, a web crawler 322 obtains source code from the code repository 330. The crawler 322 can access the code repository 330 over the network 334 in the manner described above with respect to FIG. 3A. The crawler 322 can store the source code in a version control system 324. The version control system maintains separate versions of the source code.

At some later time, a user device 332 requests one of the multiple versions of the source code from the page builder 328. The page builder 328 receives the request and obtains multiple versions of the source code from the version control system 324. The page builder 324 provides the multiple versions to the data structure builder 326.

The data structure builder 326 creates a data structure representing the multiple versions of the source code, as described above, with reference to FIG. 2A and FIG. 2B. The data structure builder provides the data structure to the page builder 328. In some implementations, the data structure builder 326 stores the data structure for later access.

Using the data structure, the page builder 328 constructs a document that can be rendered by a user device to display each version of the multiple versions of the source code. For example, the page builder can build an HTML page that includes each of the multiple versions. In some implementations, the HTML page also includes scripts or programs, e.g., JavaScript scripts or Java programs, and graphical user interface elements which the user can activate to switch between versions without making subsequent requests to the server.

The page builder 328 provides the HTML page to the user device 332.

FIG. 4 illustrates creating a portion of an HTML page to represent multiple versions of source code for a computer program using a data structure. The data structure 232, created as described above with reference to FIG. 2B, can be used to generate HTML content. In this example, the items in the data structure 232 are used to generate HTML div elements. For example, the source code line in item 408 is included in div 422. Similarly, source code lines in items 410 and 412 are included in divs 424 and 426, respectively.

Optionally, consecutive items from the data structure 232 that indicate that the lines exist in the same set of versions are grouped together into a single HTML element. For example items 404 and 406 each indicate that the lines stored in the items exist in the first version, the second version, and the third version. These items are grouped together and the lines of source code stored in these items are included in a single div 420. Similarly, the items 414 and 416 both indicate that the source code stored in these items exists in the first version, the second version, and the third version, and therefore lines of source code stored in these items are included in a single div 428.

HTML elements identify each version to which that element applies. For example, the HTML document may include a cascading style sheet (CSS) class for each version of the source code. Each HTML element that includes at least one line of source code identifies each CSS class corresponding to a version in which the included source code exists. For example, div 420 includes a class tag that identifies CSS classes "v1v" corresponding to the first version, "v2v" corresponding to the second version, and "v3v" corresponding to the third version.

The HTML document may optionally also include a script or program that determines which HTML elements appear in the web browser displaying the HTML document. For example, the script can alter the style of the HTML element to cause it to display in-line with the HTML page or not to display at all. This script may be executed in response to a user action, for example changing the position of a scrollbar, clicking on a link, selecting a check box, or pressing a button. Modifying the style of the HTML element to display the version identified by displayVersion parameter can be performed, for example, by the script:

```
function switchversions(displayVersion) {
    var thedivs;
    thedivs = document.getElementsByTagName('div');
    for (var i = 0; i < thedivs.length; i++) {
        if (thedivs[i].className.indexOf(displayVersion) >=0) {
            thedivs[i].style.display="inline";
        } else {
            thedivs[i].style.display="none";
        }
    }
}
```

The script includes a function that accepts the name or other identifier of the version to display as a parameter. The function obtains all of the div HTML elements on the document. The script loops through the div HTML elements and compares the class name associated with the div to the version to display. If the version to display is included in the class name then the corresponding div HTML element is displayed; otherwise, it is not displayed.

In some implementations, the data structure is stored on the HTML page. In response to receiving a request for a particular version of the source code, a script on the HTML page generates the requested version from the data structure. In another implementation, the entire data structure is added to the HTML page, and only the requested lines are visible. For example, the data structure 232 would produce the HTML:

```
<div style="display: block">class HelloWorld {</div>
<div style="display: block"> public static void main (...)</div>
<div style="display: none"> System.out.println("Hello World!");</div>
<div style="display: block"> System.out.println("Hello World Wide Web!");</div>
<div style="display: none"> System.out.println("Goodbye!");</div>
<div style="display: block"> }</div>
<div style="display: block">}</div>
```

To change the requested version, a script modifies the style of the div tag. Div tags that include lines that are part of the requested version are displayed, while div tags that do not include lines that are part of the requested version are not displayed.

Figure 5:
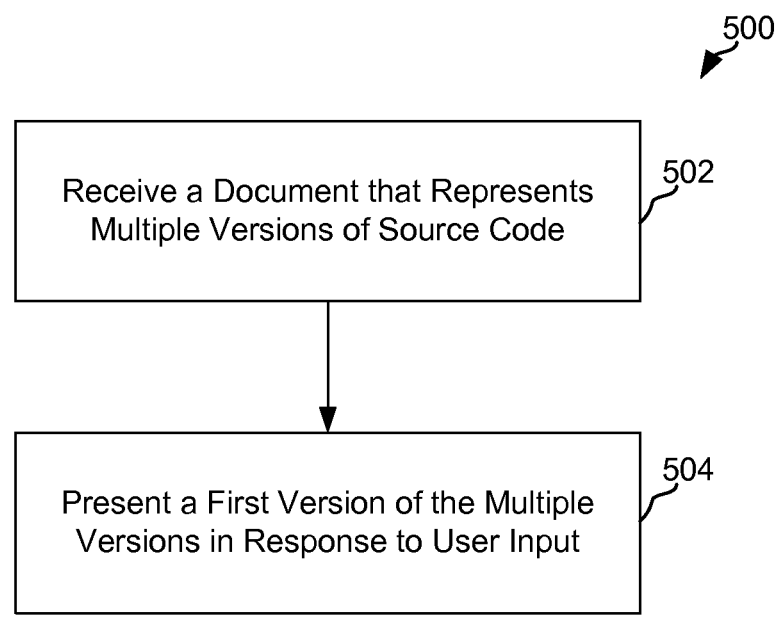
FIG. 5 is a flow chart of an example process for the rapid presentation of versions.

FIG. 5 is a flow chart of an example process 500 for the rapid presentation of versions. The process can be implemented, for example, by a user device interacting with a user.

The process 500 receives a document that includes a representation of multiple versions of source code (502). The document can be an HTML page with div elements corresponding to portions of the document. Optionally, each line of the source code may be uniquely represented by a portion of the content and each portion of the content identifies each version that includes the line.

The process 500 presents a first version of the multiple versions in response to user input selecting the first version. For example, the portions of the document that include lines of source code from the first version are made visible and the portions of the document that include lines of source code that are not in the first version are hidden. When each of the portions of the document that include lines from the first version are displayed, the process presents all of the lines of the first version in the order they appear in the first version.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

As alternatives or additions to the attached claims and the embodiments described above, the following embodiments are also innovative:

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by a user device interacting with a user and a server system, the method comprising:
   receiving, by the server system, a request from a user device for source code of a computer program, wherein the program has multiple versions of source code and at least one pair of versions share a common line;
   obtaining, by the server system, a data structure corresponding to the multiple versions, the data structure including an entry for each distinct line occurring in the versions, each entry identifying all of the versions in which the corresponding unique line occurs;
   generating, by the server system, a document based on the data structure, the document including content of the multiple versions of source code of the computer program, wherein each distinct line is represented only once in the document and the representation of each distinct line identifies every version of the source code in which the line appears;
   receiving, by the user device, the document, from the server system;
   presenting to a user, by the user device, a user interface element that enables the user to select one of the multiple versions of the source code;
   receiving, by the user device, from the user a selection of a first version of the source code;
   extracting, by the user device, the content of the first version from the document by identifying the distinct lines of the document that identify the first version based solely on the content in the document and without receiving additional information from the server system; and
   displaying, by the user device, the distinct lines of the document that identify the first version and not displaying the distinct lines of the document that do not identify the first version.

2. The method of claim 1, further comprising:
   receiving input from the user, the input identifying a second version of the multiple versions; and
   presenting the second version of the multiple versions to the user including displaying portions of the document that identify the second version and hiding portions of the document that do not identify the second version.

3. The method of claim 1, wherein each line is delineated by an end of line character.

4. The method of claim 1, wherein ordering of the portions in the document substantially preserves the ordering of the lines in each version of the multiple versions, the method further comprising sending, by the server system, the document to the user device.

5. A system comprising:
   a server system comprising: one or more computers and one or more storage devices storing instructions that are operable, when executed by the one or more computers, to cause the one or more computers to perform operations comprising:
      receiving a request for source code of a computer program, wherein the program has multiple versions of source code and at least one pair of versions share a common line,
      obtaining a data structure corresponding to the multiple versions, the data structure including an entry for each distinct line occurring in the versions, each entry identifying all of the versions in which the corresponding unique line occurs, and
      generating a document based on the data structure, the document including content of the multiple versions of source code of the computer program, wherein each distinct line is represented only once in the document and the representation of each distinct line identifies every version of the source code in which the line appears; and
   a user device storing instructions that are operable, when executed by the user device, to cause the user device to perform operations comprising:
      receiving the document, from the server system,
      presenting to a user a user interface element that enables the user to select one of the multiple versions of the source code,
      receiving from the user a selection of a first version of the source code,
      extracting the content of the first version from the document by identifying the distinct lines of the document that identify the first version based solely on the content in the document and without receiving additional information from the server system, and
      displaying the distinct lines of the document that identify the first version and not displaying the distinct lines of the document that do not identify the first version.

6. The system of claim 5, wherein the instructions of the user device are further operable, when executed by the user device, to cause the user device to perform operations comprising:
   receiving input from a user, the input identifying a second version of the multiple versions; and presenting the second version of the multiple versions to the user including displaying portions of the document that identify the second version and hiding portions of the document that do not identify the second version.

7. The system of claim 5, wherein each line is delineated by an end of line character.

8. The system of claim 5, wherein ordering of the portions in the document substantially preserves the ordering of the lines in each version of the multiple versions; and the instructions of the server system are further operable to send the document to the user device.

9. A non-transitory computer storage device encoded with computer program instructions that when executed by one or more computers cause the one or more computers to perform operations comprising:

receiving, by the server system, a request from a user device for source code of a computer program, wherein the program has multiple versions of source code and at least one pair of versions share a common line;

obtaining, by the server system, a data structure corresponding to the multiple versions, the data structure including an entry for each distinct line occurring in the versions, each entry identifying all of the versions in which the corresponding unique line occurs;

generating, by the server system, a document based on the data structure, the document including content of the multiple versions of source code of the computer program, wherein each distinct line is represented only once in the document and the representation of each distinct line identifies every version of the source code in which the line appears;

receiving, by the user device, the document, from the server system;

presenting to a user, by the user device, a user interface element that enables the user to select one of the multiple versions of the source code;

receiving, by the user device, from the user a selection of a first version of the source code;

extracting, by the user device, the content of the first version from the document by identifying the distinct lines of the document that identify the first version based solely on the content in the document and without receiving additional information from the server system; and displaying, by the user device, the distinct lines of the document that identify the first version and not displaying the distinct lines of the document that do not identify the first version.

10. The computer storage device of claim 9, wherein the instructions that when executed by one or more computers further cause the one or more computers to perform operations comprising:

receiving input from the user, the input identifying a second version of the multiple versions; and presenting the second version of the multiple versions to the user including displaying portions of the document that identify the second version and hiding portions of the document that do not identify the second version.

11. The computer storage device of claim 9, wherein each line is delineated by an end of line character.

12. The computer storage device of claim 9, wherein ordering of the portions in the document substantially preserves the ordering of the lines in each version of the multiple versions, the operations further comprising sending the document to the user device.

* * * * *